United States Patent [19]

Oh et al.

[11] Patent Number: 6,035,218

[45] Date of Patent: *Mar. 7, 2000

[54] RADIO SIGNAL REPEATING APPARATUS OF A CODE DIVISION MULTIPLE ACCESS COMMUNICATION SYSTEM

[75] Inventors: Chang-Heon Oh, Seoul; Sung-Gyu Kim, Seongnam, both of Rep. of Korea

[73] Assignee: Samsung Electronics Co., Ltd., Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/853,121

[22] Filed: May 8, 1997

[30] Foreign Application Priority Data

May 9, 1996 [KR] Rep. of Korea ............. 96/15231

[51] Int. Cl.[7] ............. H04B 7/04; H04B 1/40
[52] U.S. Cl. ............. 455/562; 455/101; 455/272; 455/276.1; 455/504; 370/320; 370/334; 370/342; 375/267; 375/299; 375/347
[58] Field of Search ............. 455/562, 504, 455/65, 523, 14, 7, 10, 15, 282, 273, 276.1, 278.1, 279.1, 277.1, 101, 137, 138, 139; 370/320, 334, 335, 342; 375/200, 267, 299, 347, 211

[56] References Cited

U.S. PATENT DOCUMENTS

| 4,901,307 | 2/1990 | Gilhousen et al. . |
| 4,972,505 | 11/1990 | Isberg ............. 455/15 |
| 5,280,472 | 1/1994 | Gilhousen et al. . |
| 5,437,055 | 7/1995 | Wheatley, III . |
| 5,513,176 | 4/1996 | Dean et al. . |
| 5,577,265 | 11/1996 | Wheatley, III . |

FOREIGN PATENT DOCUMENTS

WO9506365  3/1995  WIPO .

*Primary Examiner*—Lee Nguyen
*Attorney, Agent, or Firm*—Dilworth & Barrese

[57] ABSTRACT

A radio signal repeating apparatus of a code division multiple access communication system. A plurality of antennas is constructed by utilizing both time diversity and space diversity, and a code division multiple access signal processed by a base station is transmitted to a corresponding mobile station through the use of such time diversity and the space diversity.

6 Claims, 4 Drawing Sheets

RADIO SIGNAL REPEATING APPARATUS OF A CODE DIVISION MULTIPLE ACCESS COMMUNICATION SYSTEM

BACKGROUND OF THE INVENTION

1. Field of the Invention

The present invention relates to a radio signal repeating apparatus of a code division multiple access communication system for supporting service within a radio signal shadow area, particularly, e.g., within the interior of a building.

2. Description of the Related Art

Generally, a cellular communication system such as a code division multiple access (CDMA) system includes a plurality of base stations, each serving as the base unit in a particular cell, and a plurality of mobile stations connected to each base station to receive a call service from a corresponding base station. Each base station is typically installed in a fixed position, while each mobile station varies according to the position of the user. For example, the mobile station may be situated in the interior of a building, a subway station, an underground arcade, etc. When a radio signal is transmitted from the base station to a mobile station in the interior of a building, there is typically a significant signal path loss. The radio signal within the interior of a building is characterized by multipath fading having a very short delay. Therefore, if the radio signal is transmitted to the interior of a building from the base station or to a wall or an elevator within the building, the quality of the transmitted signal deteriorates due to a known effect referred to as the shadow phenomenon, thereby degrading the performance of the system.

SUMMARY OF THE INVENTION

It is therefore an object of the present invention to provide a radio signal repeating apparatus for enlarging the service area of a CDMA communication system.

It is another object of the present invention to provide a radio signal repeating apparatus of a CDMA communication system for supporting a call service even to a mobile station situated within a radio signal shadow area.

It is still another object of the present invention to provide a radio signal repeating apparatus of a CDMA communication system for transmitting a radio signal from a base station to a mobile station without any substantial signal loss.

It is a further object of the present invention to provide a radio signal repeating apparatus of a CDMA communication system for preventing a signal transmitted from a base station from substantially deteriorating.

To achieve these and other objects, the present invention provides a radio signal repeating apparatus of a CDMA communication system wherein a plurality of antennas are constructed to operate in accordance with time diversity and space diversity, and whereby a CDMA signal processed by a base station is transmitted to a corresponding mobile station through the implementation of such time diversity and space diversity.

In accordance with one aspect of the present invention, a radio signal repeating apparatus of a CDMA communication system includes a first antenna; a second antenna distributively arranged in a different spacial relationship from the first antenna; one base station; and a distributed antenna interface, connected between the base station and the first and second antennas, for receiving a signal transmitted from the base station, delaying the received signal for a preset time, and transmitting the undelayed signal and the delayed signal to the first and second antennas, respectively. Preferably, the distributed antenna interface delays a signal transmitted from the base station for at least approximately one microsecond ($\mu s$), transmits the undelayed signal to the first antenna, and transmits the delayed signal to the second antenna. Furthermore, the first and second antennas are preferably installed in a radio signal shadow area (i.e., area in which shadow phenomenon adversely affects the radio signal), such as within the interior of a building, to support service therein.

In accordance with another aspect of the present invention, a radio signal repeating apparatus of a CDMA communication system includes one base station; a plurality of distributed antennas distributively connected to each other in space; and a plurality of distributed elements corresponding respectively to the plurality of distributed antennas. The first distributed element among the plurality of distributed elements is electrically connected between the base station and the first distributed antenna among the plurality of distributed antennas, receives and processes a signal transmitted from the base station, and transmits the processed signal to the first distributed antenna. Each of the remaining distributed elements processes the signal processed by the previous distributed element, and transmits the processed signal to the next distributed antenna and then to the next distributed element and so on. Preferably, each of the distributed elements compensates a loss associated with the signal that is processed by the previous distributed element, the loss being caused by the electrical connection of the distributed elements. Each of the distributed elements preferably processes compensation for an input signal, delays the compensation-processed signal for a preset time, preferably approximately 2.5 microseconds, and transmits the delayed signal to the next distributed element. Further, each of the distributed elements is preferably connected through a cable to each other and operates via a direct current power source supplied through the cable. The antennas are installed within a radio signal shadow area, such as within the interior of a building, to support service therein.

The present invention will be more specifically described with reference to the attached drawings. In the drawings, like reference numerals or symbols designate like parts. In the following description, well known features and constructions are not described in detail so as not to obscure the present invention. Moreover, the terms described below are defined in accordance with functions associated with the present invention and, as a result, such terms may differ depending on a particular chip designer's implementations and practices. Therefore, the definition of terms should be understood in the context of the entire specification.

DETAILED DESCRIPTION OF PREFERRED EMBODIMENTS

Figure 1:
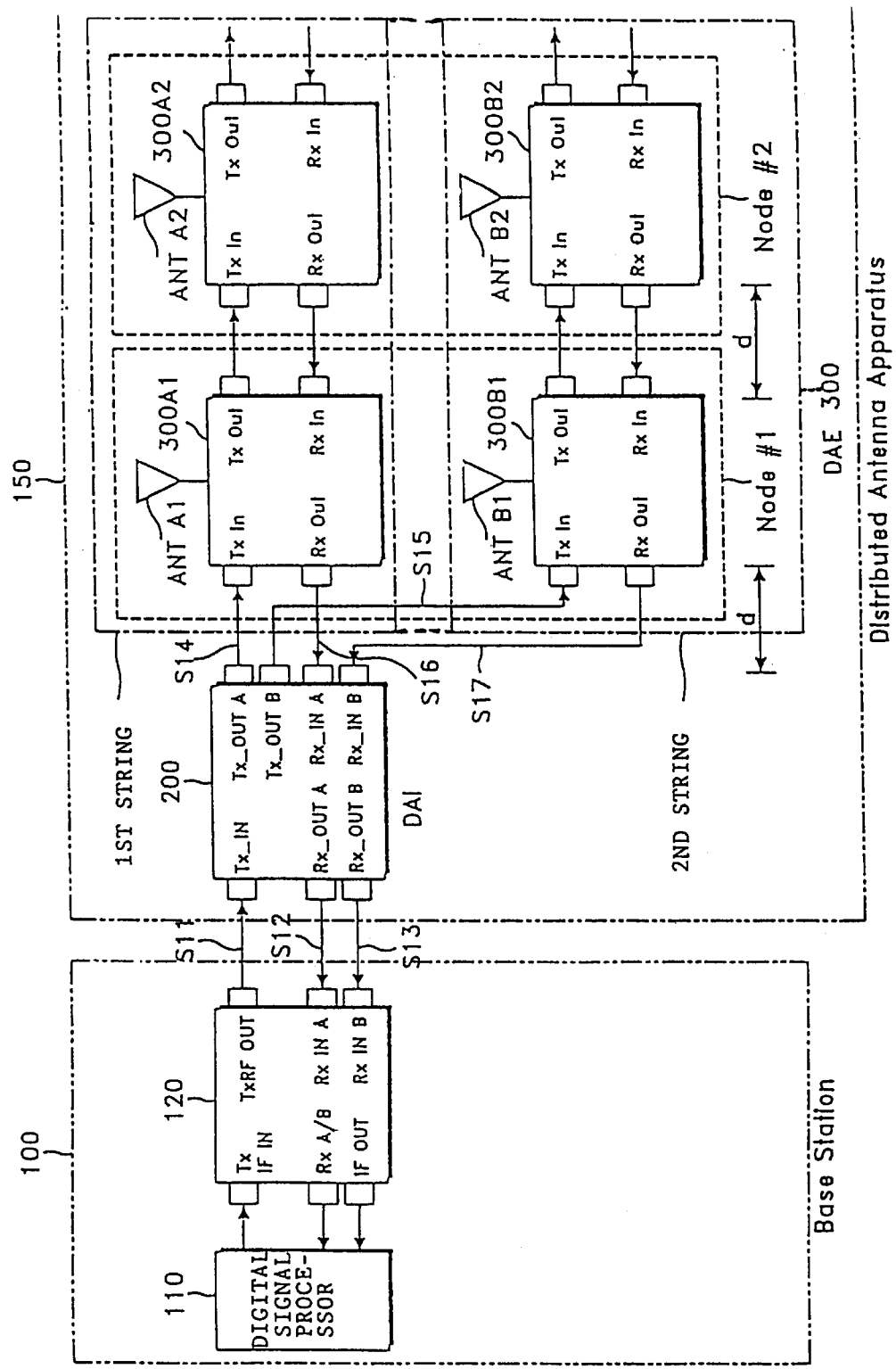
FIG. 1 is a block diagram of one embodiment of a radio signal repeating apparatus of a CDMA communication system according to the present invention.

Referring to FIG. 1, a radio signal repeating apparatus of a CDMA communication system according to the present invention includes a base station 100 and a distributed antenna apparatus 150. The base station 100 has a digital signal processor 110 for processing a digital signal in order to generate an intermediate frequency signal and, further, for processing a received intermediate frequency signal to restore a digital signal. The base station 100 further includes a transceiver 120 for processing the intermediate frequency signal generated by the digital signal processor 110 and provided thereto in order to transmit a CDMA high frequency signal to the exterior (i.e., external to the base station). The transceiver 120 also processes a CDMA high frequency signal received from the exterior to generate an intermediate frequency signal. It is to be appreciated that the construction of the base station 100 is known in the art. The distributed antenna apparatus 150 includes a distributed antenna interface (DAI) 200 and a distributed antenna element (DAE) 300, both employing time diversity and space diversity in order to support service even in a radio signal shadow area, such as the interior of a building, a subway station, an underground arcade, etc.

The DAI 200 is electrically connected between the transceiver 120 of the base station 100 and the DAE 300. The DAI 200 receives, through its terminal Tx_IN, a high frequency signal S11 approximately between 869–894 MHz transmitted from the transceiver 120, attenuates and amplifies the signal S11, and generates the attenuated and amplified signal through its terminal Tx_OUT A as a signal S14. Further, the DAI 200 delays the attenuated and amplified signal for a prescribed time, and generates the delayed signal through its terminal Tx_OUT B as a signal S15. Among signals generated from the DAI 200, the signal S15 causes a mobile station to operate as a RAKE receiver (i.e., a diversity receiver) and is delayed by approximately 1.25 $\mu$s as compared with the signal S14. The DAI 200 also receives a signal S16 of approximately between 824–849 MHz and a signal S17 of approximately between 824–849 MHz through its terminals Rx_IN A and Rx_IN B, respectively. The DAI 200 attenuates and amplifies the received signals S16 and S17, generates the attenuated and amplified signals as signals S12 and S13, respectively, and supplies the signals S12 and S13 to the transceiver 120 of the base station 100 through its terminals Rx_OUT A and Rx_OUT B, respectively.

The DAE 300 includes a first string of DAEs consisting of a series of antennas ANT A1 and ANT A2, distributively connected to each other in space, and distributed elements 300A1 and 300A2 corresponding to the respective antennas ANT A1 and ANT A2. The DAE 300 further includes a second string of DAEs consisting of a series of antennas ANT B1 and ANT B2, distributively connected to each other in space but in a different space than the first string of DAEs, and distributed elements 300B1 and 300B2 corresponding to the respective antennas ANT B 1 and ANT B2. It should be noted that the distributed elements 300A1 and 300B1 are identically positioned in any one space to form a first node Node #1, and the distributed elements 300A2 and 300B2 are identically positioned in another space to form a second node Node #2, thereby constituting space diversity. It should also be noted that the distributed elements and antennas can be increased in number although FIG. 1 shows, by way of example, that the DAE strings each have only two distributed elements and two antennas.

One distributed element (i.e., 300A1, 300A2, 300B1, 300B2) transmits a signal received from the DAI 200 or another distributed element to the mobile station through an antenna (i.e., ANT A1, ANT A2, ANT B1, ANT B2) and transmits a signal received from the mobile station to another distributed element or the DAI 200. Each distributed element delays the CDMA signal which is transmitted from the transceiver 120 of the base station 100 and processed by the DAI 200. Two distributed elements of the first node, Node #1 respectively receive signals delayed by approximately 0 $\mu$s (undelayed) and 1.25 $\mu$s (delayed) from the DAI 200. The two distributed elements of Node #1 then respectively transmit signals further delayed by approximately 2.5 $\mu$s, thereby resulting in signals respectively delayed by approximately 2.5 $\mu$s (0 $\mu$s+2.5 $\mu$s) and 3.75 $\mu$s (1.25 $\mu$s+2.5 $\mu$s), to the next node, Node #2. The two distributed elements of Node #1 then also respectively transmit the received signals to the mobile station through the antennas ANT A1 and ANT B1. Since the mobile station receives signals transmitted from two nodes, as previously mentioned, the mobile station can operate as a RAKE receiver. For example, if the mobile station moves to the second node from the first node, since the strength of the 0 $\mu$s and 1.25 $\mu$s delayed signals becomes smaller and the strength of 2.5 $\mu$s and 3.75 $\mu$s delayed signals becomes larger, the mobile station receives signals provided from the second node. This means that the mobile station operates as the RAKE receiver.

Figure 2:
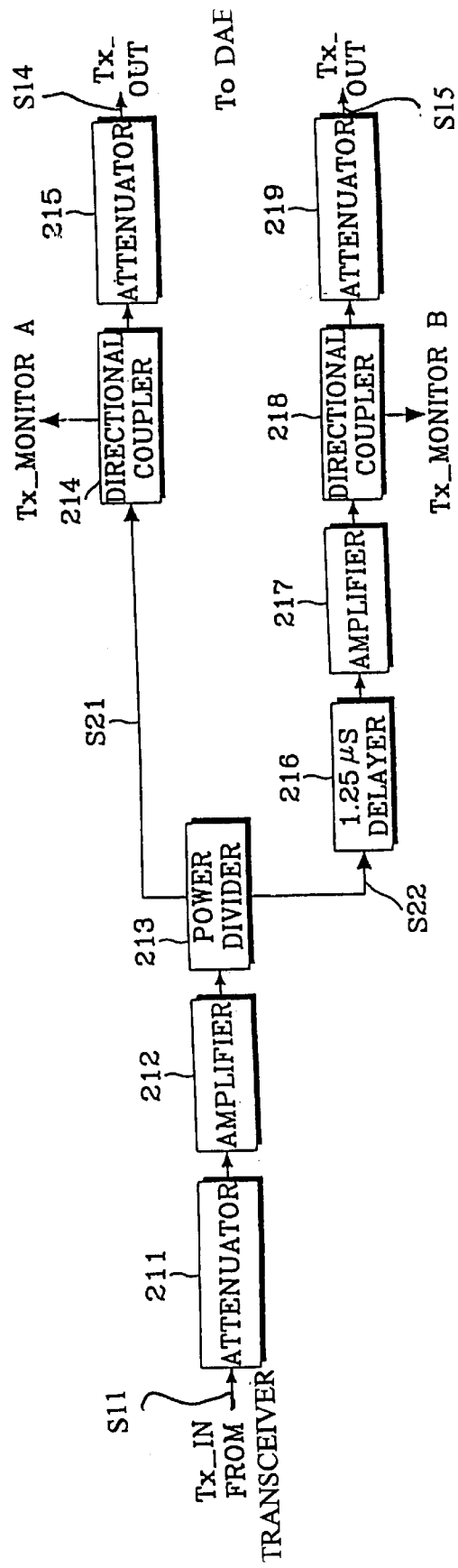
FIGS. 2A & 2B are a block diagram of one embodiment of a distributed antenna interface shown in FIG. 1.
Figure 2:
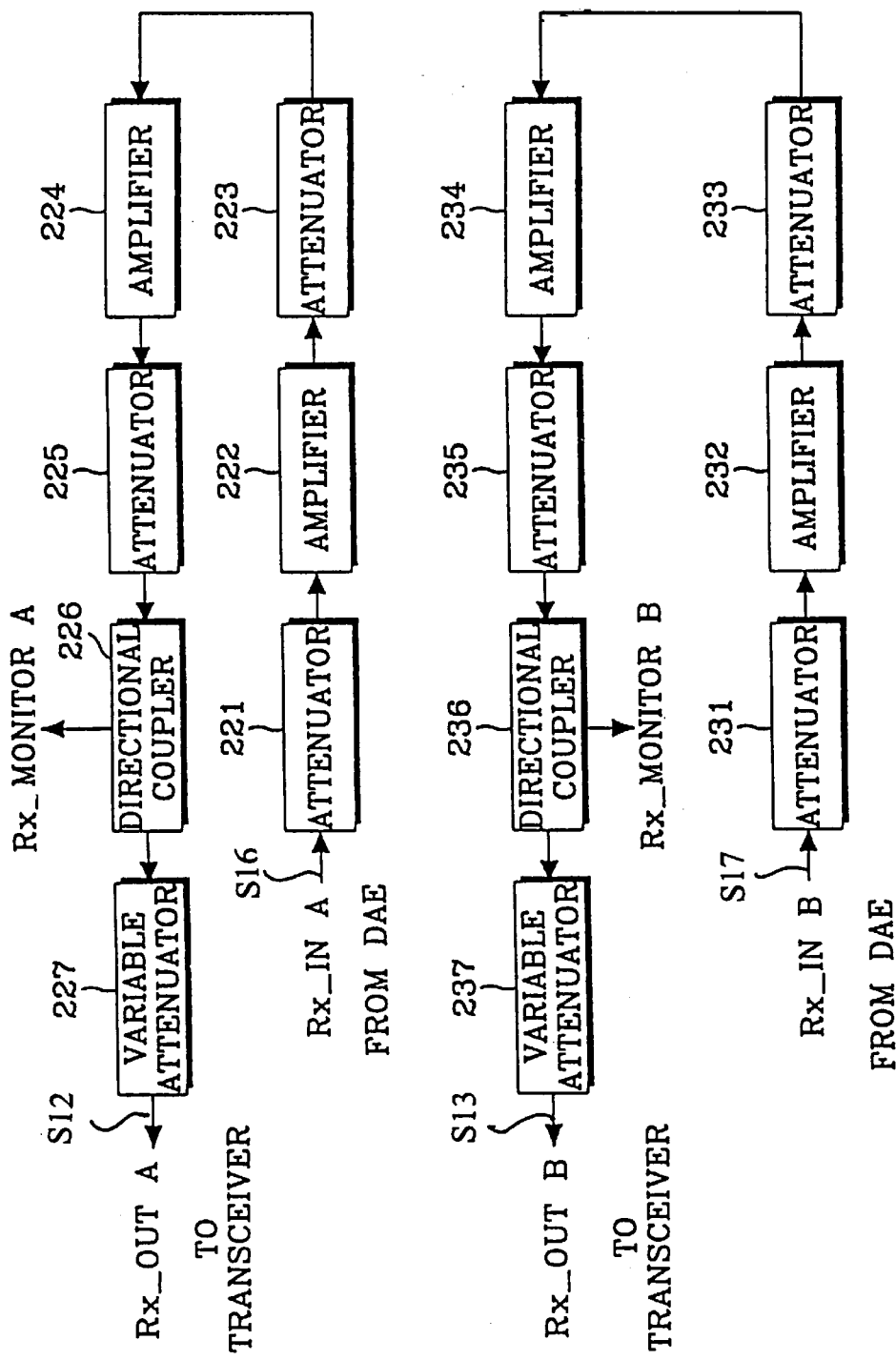

FIGS. 2A and 2B illustrate the DAI 200 shown in FIG. 1. As shown in FIG. 2A, the signal S11 of approximately between 869–894 MHz, transmitted from the transceiver 120 of the base station 100, passes through an attenuator 211 and an amplifier 212 and is divided into signals S21 and S22 by a 2-directional power divider 213. The signal S22 is delayed by approximately 1.25 $\mu$s by a delayer 216. This delay value causes the mobile station to operate as the RAKE receiver because there is typically needed a delay of approximately 1 $\mu$s or more under the circumstances associated with an 800 MHz mobile communication system. The attenuation caused by the delayer 216 on signal S22 is offset by amplifying S22 in an amplifier 217. Normal generation of the signals S21 and S22 is monitored by directional couplers 214 and 218, respectively. Thereafter, the signals S21 and S22 are again attenuated by attenuators 215 and 219 and output as the signals S14 and S15 through the terminals Tx_OUT A and Tx_OUT B, respectively.

As shown in FIG. 2B, the DAI 200 also receives signals from the DAE 300 through the terminals Rx_IN A and Rx_IN B. The received signals S16 and S17 are amplified to a stable level by attenuators 221, 231, 223, 233, 225 and 235 and amplifiers 222, 232, 224 and 234. Directional couplers 226 and 236 monitor whether the signals S16 and S17 are normally received. Variable attenuators 227 and 237 adjust a receiving level associated with signals S12 and S13 which are transmitted to the transceiver so as to have a suitable gain which takes into account a cable loss between the DAE 300 and the DAI 200. Such variable attenuation is provided in order that an excessive receiving level is not received by the transceiver 120 of the base station 100 (i.e., so that a proper level is received).

Figure 3:
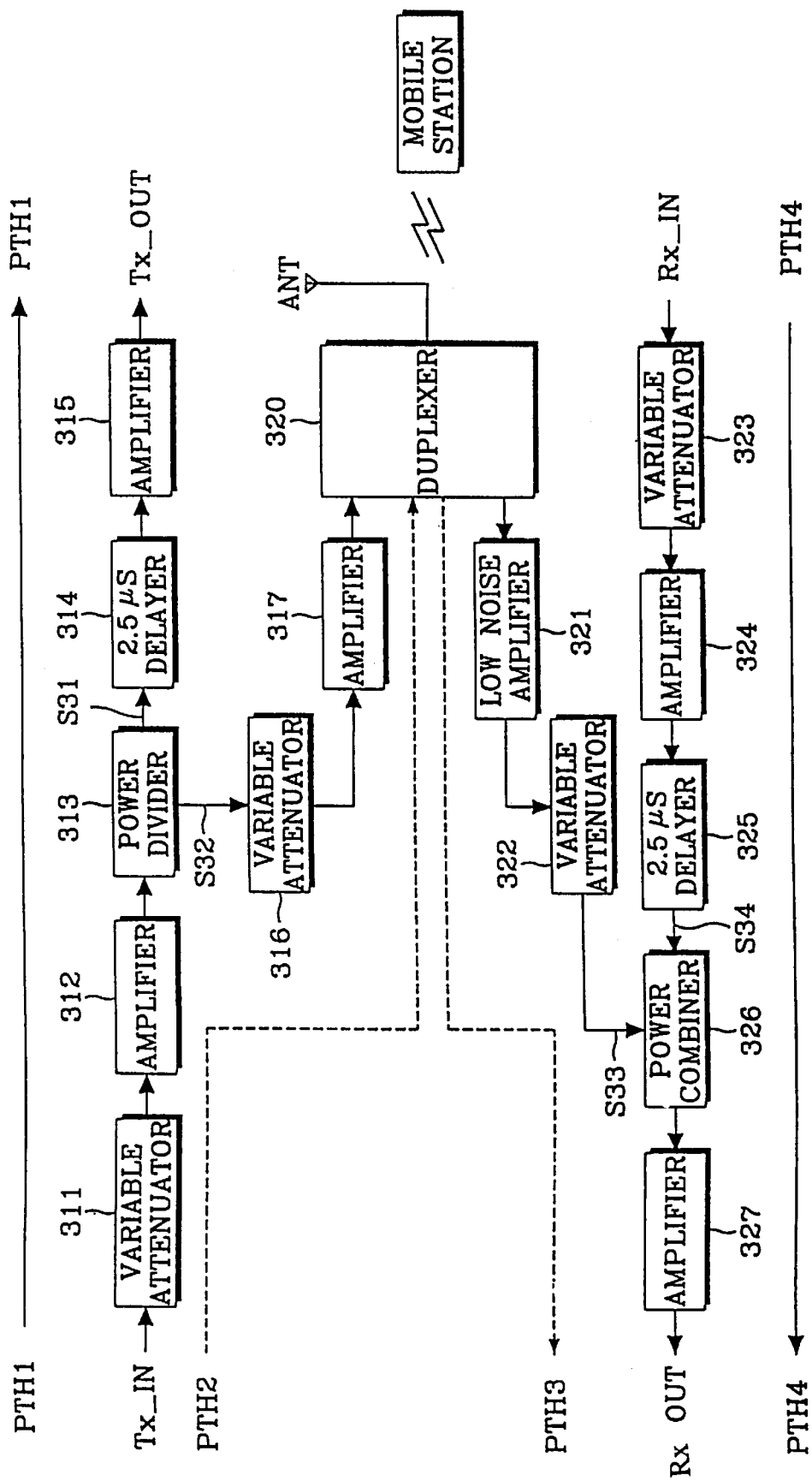
FIG. 3 is a block diagram of one embodiment of a distributed element shown in FIG. 1.

FIG. 3 illustrates the distributed element (i.e., 300A1, 300A2, 300B1, 300B2) shown in FIG. 1. The distributed element transmits (hereinafter, referred to as a "forward antenna path") a signal received from the DAI 200 or another distributed element to the mobile station through an antenna (i.e., ANT A1, ANT A2, ANT B1, ANT B2), and transmits (hereinafter, referred to as a "reverse antenna path") a signal received from the mobile station through the antenna to the DAI 200 or another distributed element. Moreover, the distributed element transmits (hereinafter, referred to as a "forward repeating path") a signal received from the DAI 200 or another distributed element to still another distributed element, and transmits (hereinafter, referred to as "reverse repeating path") a signal received from another distributed element to still another distributed element or the DAI 200. In FIG. 3, reference symbols PTH1, PTH2, PTH3 and PTH4 designate the forward repeating path, the forward antenna path, the reverse antenna path and the reverse repeating path, respectively.

The forward path will now be described.

A signal received by the distributed element is adjusted in its level by a variable attenuator 311 so that a loss (corresponding to a length d shown in FIG. 1) associated with a cable connected between the distributed elements or between the DAI 200 and the distributed element can be compensated on the forward repeating path PTH1. If the type of cable and the length d of the cable are known and, thus, the loss of the cable is determined, an amplifier 312 may amplify a level corresponding to the loss. However, the length d of the cable may differ according to the distributed element and, thus, the cable loss varies. Therefore, an output level of the forward/reverse repeating path is maintained at a constant value by adjusting this attenuation value by use of the variable attenuator 311 when installing the system as described herein. The signal is then provided to an amplifier 312 where it is amplified and then to a two-directional power divider 313 where it is divided into two signals, that is, a repeating path signal S31 and an antenna path signal S32. The repeating path signal S31 is delayed by approximately 2.5 $\mu$s by a delayer 314, amplified by an amplifier 315 by an amount offsetting the attenuated amount of the delayer 314, and transmitted to another distributed element. The antenna path signal S32 is again controlled by a variable attenuator 316 so that a transmitting signal generated through an antenna terminal may be a constant level. A signal generated from the variable attenuator 316 is amplified by an amplifier 317, transmitted to the antenna through a duplexer 320, and emitted into space. The emitted signal is received by the mobile station.

The reverse path will now be described.

A signal received by the distributed element is adjusted in its level by a variable attenuator 323 so that a loss associated with a cable connected between the distributed elements can be compensated for on the reverse repeating path. The signal attenuated by the variable attenuator 323 is amplified by an amplifier 323, delayed by a delayer 325 by approximately 2.5 $\mu$s, and added to a reverse antenna path signal S33 by a two-directional power combiner 326. A signal received from the antenna is transmitted to a low noise amplifier 321 through the duplexer 320. The low noise amplified signal is controlled in its level by a variable attenuator 322 for constantly adjusting a level of the reverse antenna path signal. The reverse antenna path signal S33 adjusted in its level by the variable attenuator 322 is added to a reverse repeating path signal S34 by the power combiner 326, amplified by an amplifier 327 and transmitted to the DAI 200 or the distributed element.

In the forward/reverse repeating path, the cable loss between the DAI and the distributed element or between the distributed elements is continuously compensated for by the distributed element, and the level-adjusted signal is transmitted to the distributed element of the next stage. Therefore, a service area is enlarged and the system can be efficiently managed. A DC power source necessary for operation of each distributed element is supplied by using a cable, and each distributed element uses such DC power source as a result of being coupled to the cable. Hence, there is no need to supply additional DC power to each distributed element.

As described above, a plurality of antennas is constructed utilizing both time diversity and space diversity, and a CDMA signal processed from a base station is transmitted to a corresponding mobile station through the use of such time diversity and space diversity. Therefore, the call service may be advantageously enlarged with respect to a mobile station situated in a radio signal shadow area, such as the interior of a building, a subway station, an underground arcade, etc. Furthermore, the radio signal of the base station is transmitted to the mobile station without substantial deterioration or loss thereby substantially improving the performance of the communication system.

It should be understood that the present invention is not limited to the particular embodiments disclosed herein as the best mode contemplated for carrying out the present invention, but that the present invention includes all embodiments falling within the scope of the appended claims.

What is claimed is:

1. A radio signal repeating apparatus of a code division multiple access communication system for transmitting and receiving a code division multiple access signal, comprising:

a first string of distributed antennas distributively connected to each other in space;

a second string of distributed antennas distributively connected to each other in space;

one repeater base station;

a distributed antenna interface electrically connected between said base station and said first and second strings of distributed antennas, for receiving a signal transmitted from said base station, delaying the received signal for a preset time, and transmitting the undelayed signal and the delayed signal to said first string of distributed antennas and to said second string of distributed antennas, respectively;

a first series of distributed elements corresponding respectively to said first string of distributed antennas; and a second series of distributed elements corresponding respectively to said second string of distributed antennas;

wherein the first distributed elements among said first and second series of distributed elements are electrically connected between said distributed antenna interface and the first distributed antennas among said first and second strings of distributed antennas, receive and process signals transmitted from said distributed antenna interface, and transmit the processed signals to said first distributed antennas, and wherein each of the remaining distributed elements processes the signal processed by the previous distributed element, and transmits the processed signal to the next distributed antenna and to the next distributed element;

wherein said distributed antenna interface receives signals from said first distributed elements among said first and second series of distributed elements, said signals being amplified and attenuated by an interchanging series of at least two amplifiers and at least two attenuators, said amplified and attenuated signals being transmitted to said repeater base station to provide a gain to compensate for a loss of the received signals between said first and second series of distributed elements and said distributed antenna interface;

each string including delayers for substantially delaying the processed signals between adjacent distributed antennas of the string so that adjacent antennas of the string transmit signals substantially delayed from one another; and at least some of said remaining distributed elements including means for compensating for a loss of the signal processed by the previous distributed element.

2. A radio signal repeating apparatus as claimed in claim 1, wherein said distributed antenna interface delays a signal transmitted from said base station for at least approximately one microsecond, transmits the undelayed signal to said first string of distributed antennas, and transmits the delayed signal to said second string of distributed antennas.

3. A radio signal repeating apparatus as claimed in claim 1, wherein each of at least some of said distributed elements include one of said delayers for substantially delaying a processed signal thereat.

4. A radio signal repeating apparatus as claimed in claim 3, wherein each of said delayers provides approximately 2.5 microseconds of delay, with the signal delayed thereat being transmitted to the next distributed element.

5. A radio signal repeating apparatus as claimed in claim 4, wherein each of said distributed elements is connected through a cable to each other and operates by a direct current power source supplied through said cable.

6. A radio signal repeating apparatus as claimed in claim 1, wherein said means for compensating for a loss of the signal processed by the previous distributed element comprises at least one variable attenuator.

* * * * *